(12) United States Patent
Suto et al.

(10) Patent No.: US 12,533,944 B2
(45) Date of Patent: Jan. 27, 2026

(54) IN-WHEEL MOTOR

(71) Applicant: Hitachi, Ltd., Tokyo (JP)

(72) Inventors: Tetsuya Suto, Tokyo (JP); Akeshi Takahashi, Tokyo (JP); Makoto Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 206 days.

(21) Appl. No.: 18/580,134

(22) PCT Filed: Jun. 29, 2022

(86) PCT No.: PCT/JP2022/026017
§ 371 (c)(1),
(2) Date: Jan. 17, 2024

(87) PCT Pub. No.: WO2023/032447
PCT Pub. Date: Mar. 9, 2023

(65) Prior Publication Data
US 2025/0033459 A1    Jan. 30, 2025

(30) Foreign Application Priority Data

Aug. 31, 2021    (JP) ................................. 2021-140876

(51) Int. Cl.
*B60K 7/00* (2006.01)
*H02K 5/173* (2006.01)
(Continued)

(52) U.S. Cl.
CPC ......... *B60K 7/0007* (2013.01); *H02K 5/1737* (2013.01); *H02K 7/088* (2013.01);
(Continued)

(58) Field of Classification Search
CPC .............. B60G 2204/148; B60G 7/008; B60K 2007/0038; B60K 2007/0092;
(Continued)

(56) References Cited

U.S. PATENT DOCUMENTS

| | | | |
|---|---|---|---|
| 2001/0048262 A1 | 12/2001 | Takano et al. | |
| 2004/0099455 A1* | 5/2004 | Nagaya | F16F 15/18 180/65.51 |
| 2014/0117744 A1* | 5/2014 | Vogler | B60K 7/0007 301/6.5 |

FOREIGN PATENT DOCUMENTS

| | | |
|---|---|---|
| CN | 102673380 A | 9/2012 |
| CN | 107487175 A | 12/2017 |

(Continued)

OTHER PUBLICATIONS

JP-2015107778-A, all pages (Year: 2015).*
Extended European Search Report received in corresponding European Application No. 22864035.5 dated Jun. 16, 2025.
International Search Report of PCT/JP2022/026017 dated Sep. 20, 2022.

*Primary Examiner* — Naishadh N Desai
(74) *Attorney, Agent, or Firm* — MATTINGLY & MALUR, PC

(57) ABSTRACT

This invention provides an in-wheel motor capable of increasing steering operability and ride comfort of a vehicle. A stator 21 of an in-wheel motor 20 comprises a stator housing 21*a* and a stator housing cover 21*b*. The stator housing 21*a* is formed of a tubular-shaped housing annular portion 21*a*1, a housing flat-plate portion 21*a*2, a fold-back portion 21*a*3, and a flange portion 21*a*4. In the stator housing 21*a*, a housing recessed portion 211 is formed of the housing flat-plate portion 21*a*2 and the fold-back portion 21*a*3. The housing recessed portion 211 is provided with a hub bearing mounting portion 216 on which a hub bearing 26 is mounted. The stator housing cover 21*b* is provided with an upper arm attachment portion 217 and a lower arm attachment portion 218 for attaching an upper arm 31 and a lower arm 32 of a suspension device 30.

10 Claims, 7 Drawing Sheets

(51) Int. Cl.
*H02K 7/08* (2006.01)
*H02K 7/102* (2006.01)
*H02K 11/33* (2016.01)
*H02K 21/14* (2006.01)
*B60G 7/00* (2006.01)

(52) U.S. Cl.
CPC ............ *H02K 7/102* (2013.01); *H02K 11/33* (2016.01); *H02K 21/14* (2013.01); *B60G 7/008* (2013.01); *B60G 2204/148* (2013.01)

(58) Field of Classification Search
CPC ...... B60K 7/0007; H02K 11/33; H02K 21/14; H02K 5/1737; H02K 7/088; H02K 7/102
See application file for complete search history.

(56) References Cited

FOREIGN PATENT DOCUMENTS

| | | |
|---|---|---|
| CN | 105270161 B | 10/2018 |
| CN | 107599824 B | 7/2019 |
| CN | 209505431 U | 10/2019 |
| CN | 111030350 A | 4/2020 |
| EP | 3287306 A1 | 2/2018 |
| JP | 2002-058228 A | 2/2002 |
| JP | 2004-115014 A | 4/2004 |
| JP | 2015107778 A * | 6/2015 |
| WO | 2016/170807 A1 | 10/2016 |

\* cited by examiner

IN-WHEEL MOTOR

TECHNICAL FIELD

The present invention relates to an in-wheel motor that drives a vehicle wheel of a vehicle or the like.

BACKGROUND ART

As an in-wheel motor in which a driving motor is incorporated in a vehicle wheel, for example, there is a technique described in PTL 1. PTL 1 discloses an in-wheel motor including a wheel to which a tire is mounted and a motor that is disposed coaxially with the wheel via an axle and drives the wheel. The motor that drives the wheel is accommodated inside a motor case. A stator is fixed to the motor case, and a rotor is provided inside the stator. A planetary gear type speed reducer is accommodated inside the rotor. The rotation of the rotor is decelerated by the speed reducer and then transmitted to the axle to drive the wheel.

CITATION LIST

Patent Literature

PTL 1: JP 2002-58228 A

SUMMARY OF INVENTION

Technical Problem

In a steering wheel that is a vehicle wheel that changes a direction of a vehicle body, it is preferable to reduce an interval (scrubbing radius) between an intersection of a tire ground contact surface and a king-pin shaft that is a rotation center of steering and a center line in a width direction of the tire when viewed from a vehicle traveling direction.

In the technique described in PTL 1, the in-wheel motor is disposed so as to protrude toward the vehicle side from the center line in the width direction of the wheel to which the tire is attached. When a steering mechanism is mounted to the in-wheel motor, it is necessary to mount the steering mechanism to a motor case located on the vehicle body side.

For this reason, the technique described in PTL 1 has a problem that the scrubbing radius increases, a large reaction force is applied to the steering mechanism at the time of steering operation, and steering is easily taken by undulation or a step on a rough road surface when the vehicle travels on the rough road surface. In addition, in the technique described in PTL 1, since the driving force of the drive wheel becomes a rotational moment around the king-pin shaft, there is a problem that controllability and ride comfort deteriorate.

An object of the present invention is to solve the above problems and to provide an in-wheel motor capable of improving steering operability and ride comfort of a vehicle.

Solution to Problem

In order to achieve the above object, the present invention provides an in-wheel motor including a motor at least a part of which is disposed inside a wheel and which transmits power to the wheel, the in-wheel motor being supported by a vehicle by using a suspension device, in which the motor includes a stator and a rotor, the rotor being disposed inside the stator and including a rotation shaft, the stator includes a stator housing opened on one side and a stator housing cover closing an open portion of the stator housing, the stator housing includes a housing annular portion having a cylindrical shape and extending in an axial direction, a housing flat plate portion extending in a radial direction orthogonal to the axial direction, a folded portion extending in the axial direction and having one end connected to the housing flat plate portion, and a flange portion extending in the radial direction orthogonal to the axial direction, and having one end connected to the other end of the folded portion and an other end connected to the housing annular portion, a housing recess is formed in the stator housing by the housing flat plate portion and the folded portion, a hub bearing mounting portion which is fixed to the housing flat plate portion and to which a hub bearing is mounted is provided at a radially central portion of the housing recess, the wheel is fixed to the hub bearing via a hub bolt, and the stator housing cover includes an upper arm mounting portion to which an upper arm of the suspension device is mounted and a lower arm mounting portion to which a lower arm is mounted.

Advantageous Effects of Invention

According to the present invention, it is possible to provide an in-wheel motor capable of improving steering operability and ride comfort of a vehicle.

DESCRIPTION OF EMBODIMENTS

Figure 1:
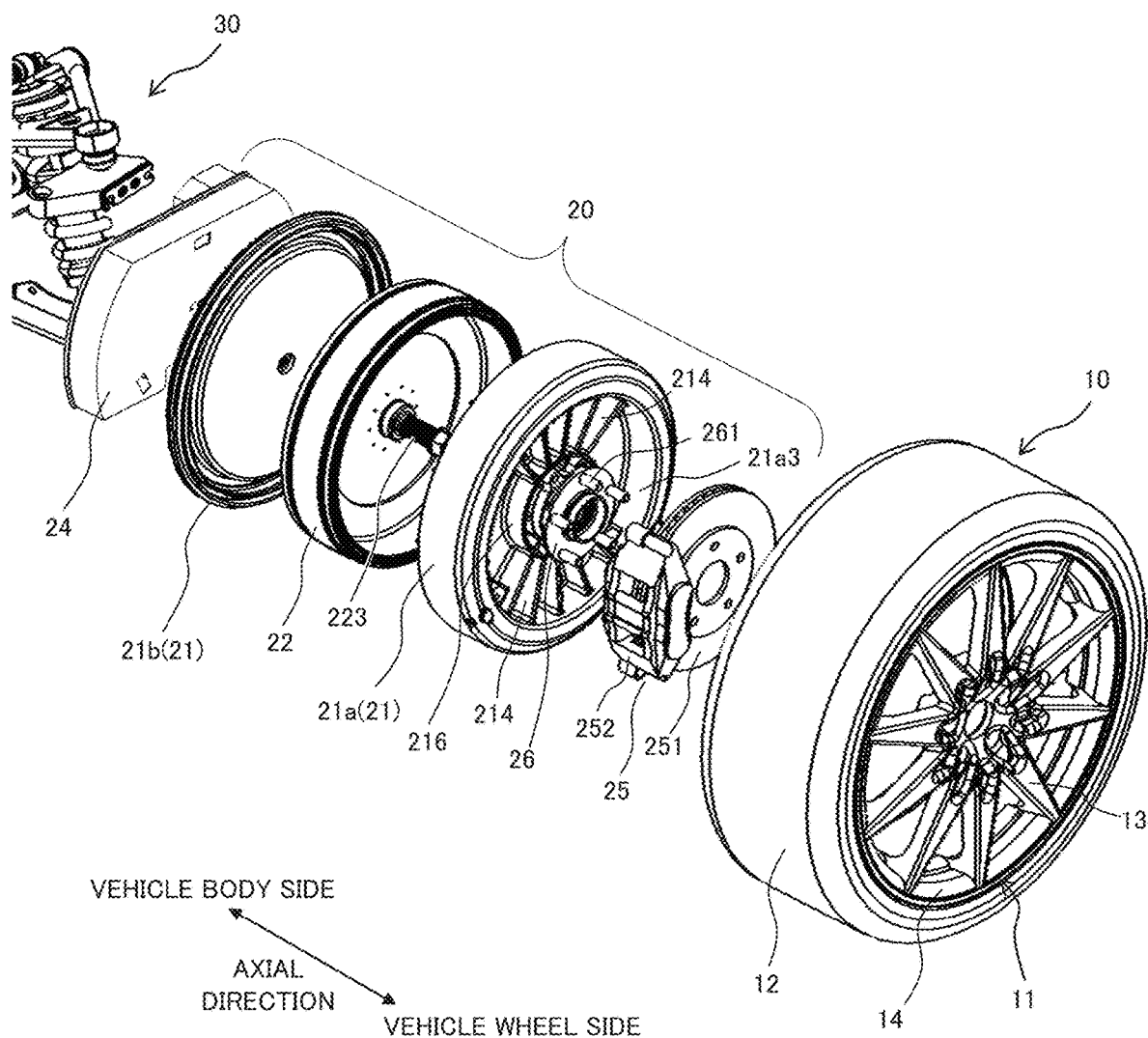
FIG. 1 is an exploded perspective view of a suspension device, an in-wheel motor, and a vehicle wheel according to an embodiment of the present invention.

Hereinafter, an embodiment of the present invention will be described with reference to the accompanying drawings. The same components are denoted by the same reference numerals, and the same description will not be repeated.

The various components of the present invention do not necessarily need to be independent and allow one component to be composed of a plurality of members, a plurality of components to be composed of one member, a certain component to be a part of another component, a part of one component and a part of another component to overlap, and the like.

Figure 2:
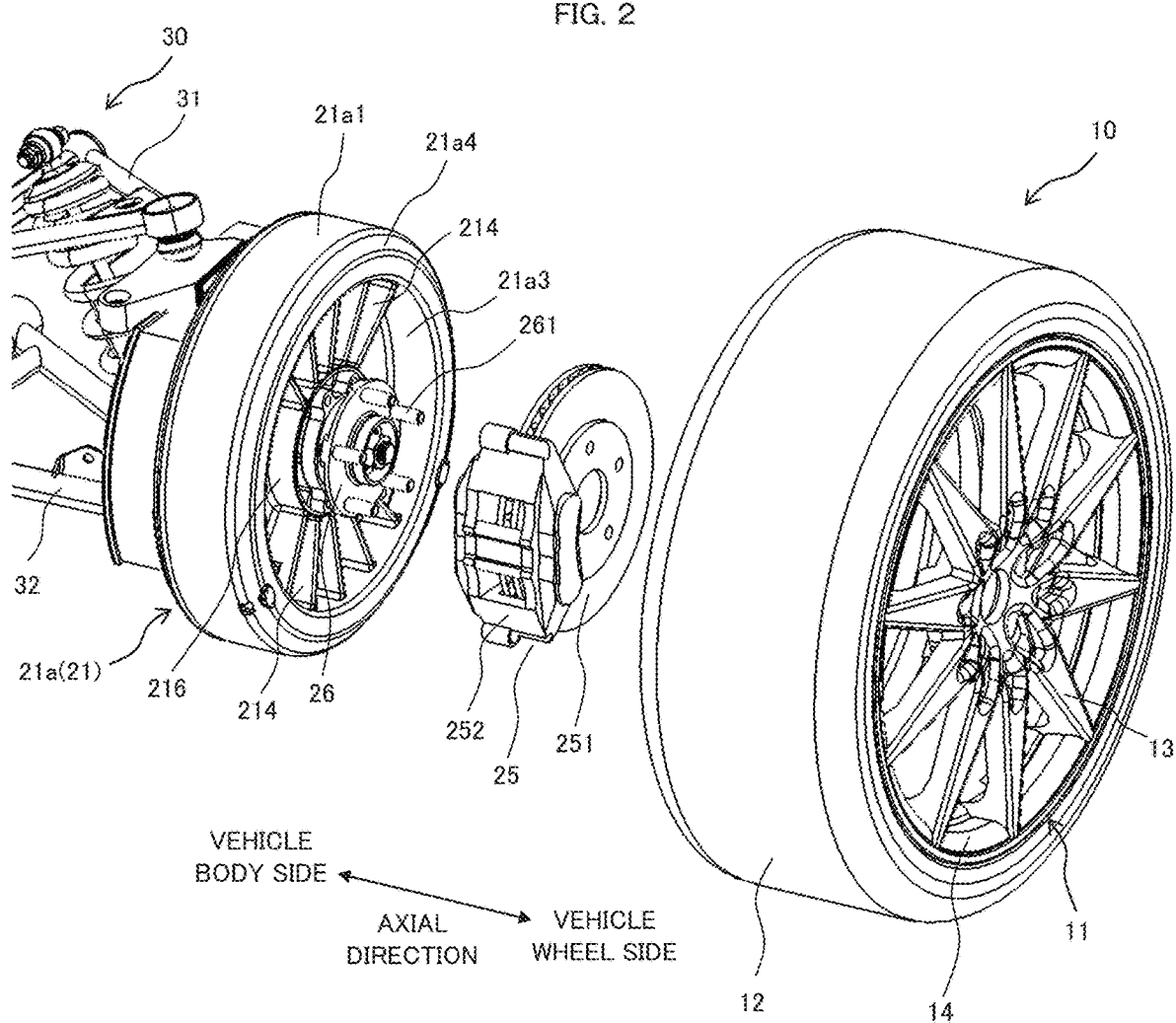
FIG. 2 is an exploded perspective view of the suspension device, the in-wheel motor, and the vehicle wheel in a state where the suspension device and the in-wheel motor according to the embodiment of the present invention are assembled.
Figure 3:
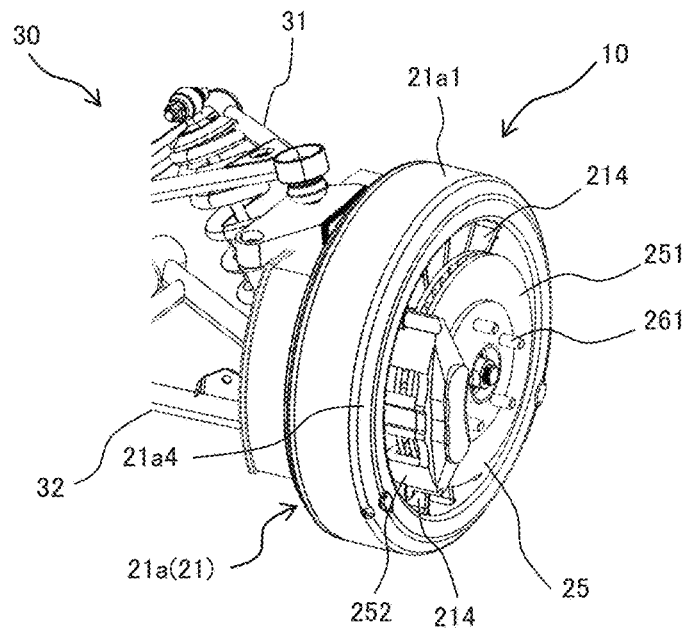
FIG. 3 is a perspective view in a state where the suspension device and the in-wheel motor according to the embodiment of the present invention are assembled.
Figure 4:
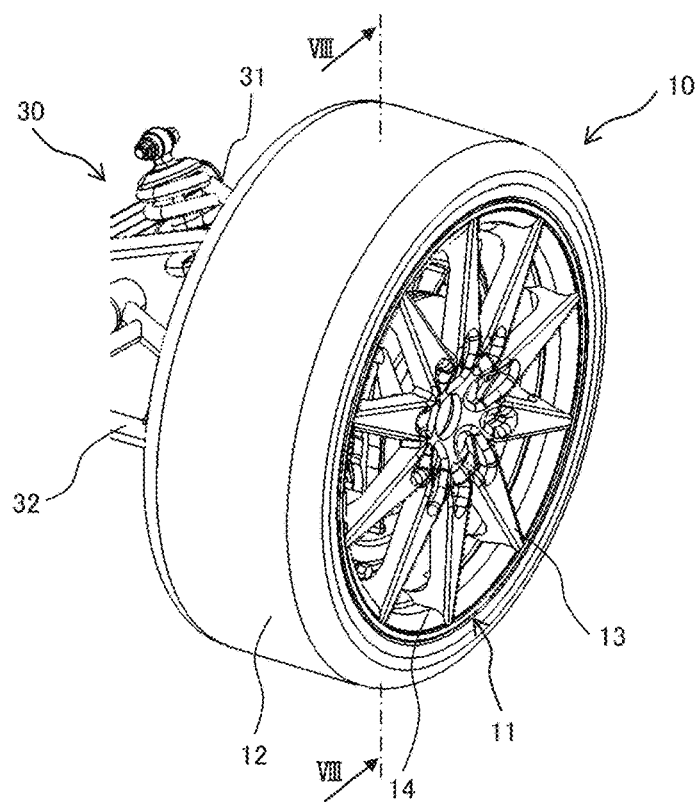
FIG. 4 is a perspective view in a state where the suspension device, the in-wheel motor, and the vehicle wheel according to the embodiment of the present invention are assembled.

FIG. 1 is an exploded perspective view of a suspension device, an in-wheel motor, and a vehicle wheel according to an embodiment of the present invention. FIG. 2 is an exploded perspective view of the suspension device, the in-wheel motor, and the vehicle wheel in a state where the suspension device and the in-wheel motor according to the embodiment of the present invention are assembled. FIG. 3 is a perspective view in a state where the suspension device and the in-wheel motor according to the embodiment of the present invention are assembled. FIG. 4 is a perspective view in a state where the suspension device, the in-wheel motor, and the vehicle wheel according to the embodiment of the present invention are assembled.

In FIGS. 1 to 4, only one wheel is shown. When a vehicle has four vehicle wheels, it is possible to provide an in-wheel motor on at least one vehicle wheel.

The vehicle wheel 10 includes a wheel 11 and a tire 12 mounted to the outer periphery of the wheel 11. The wheel 11 includes a plurality of spokes 13 radially extending radially outward from a central portion, and a rim 14 joined to the spokes 13. The tire 12 is mounted to the outer periphery of the rim 14. The spokes 13 are disposed offset so as to be located outside the vehicle with respect to the width direction of the rim 14.

An in-wheel motor 20 that rotationally drives the wheel 11 is connected to the vehicle wheel 10. At least a part of the in-wheel motor 20 is disposed inside the wheel 11.

The in-wheel motor 20 of the present embodiment refers to a driving means of a vehicle wheel housed in the wheel 11. The in-wheel motor 20 includes an inner rotor type and an outer rotor type, and further includes one including a reduction gear and one not including a reduction gear, and can be roughly classified into four types. In the present embodiment, an inner rotor type including no reduction gear (direct drive) will be described as an example, but an outer rotor type may be used.

The in-wheel motor 20 includes a stator housing 21a that is open on one side in the axial direction, a rotor 22 that is inserted into the stator housing 21a from the open side of the stator housing 21a and rotates inside the stator housing 21a, a stator housing cover 21b that closes the open side of the stator 21, an inverter device 24 fixed to the stator housing cover 21b, a brake device 25 fixed to the opposite open side of the stator housing 21a, and a hub bearing 26 that is rotatably supported by the stator housing 21a and rotates together with a brake disc 251 and the vehicle wheel 10.

Figure 8:
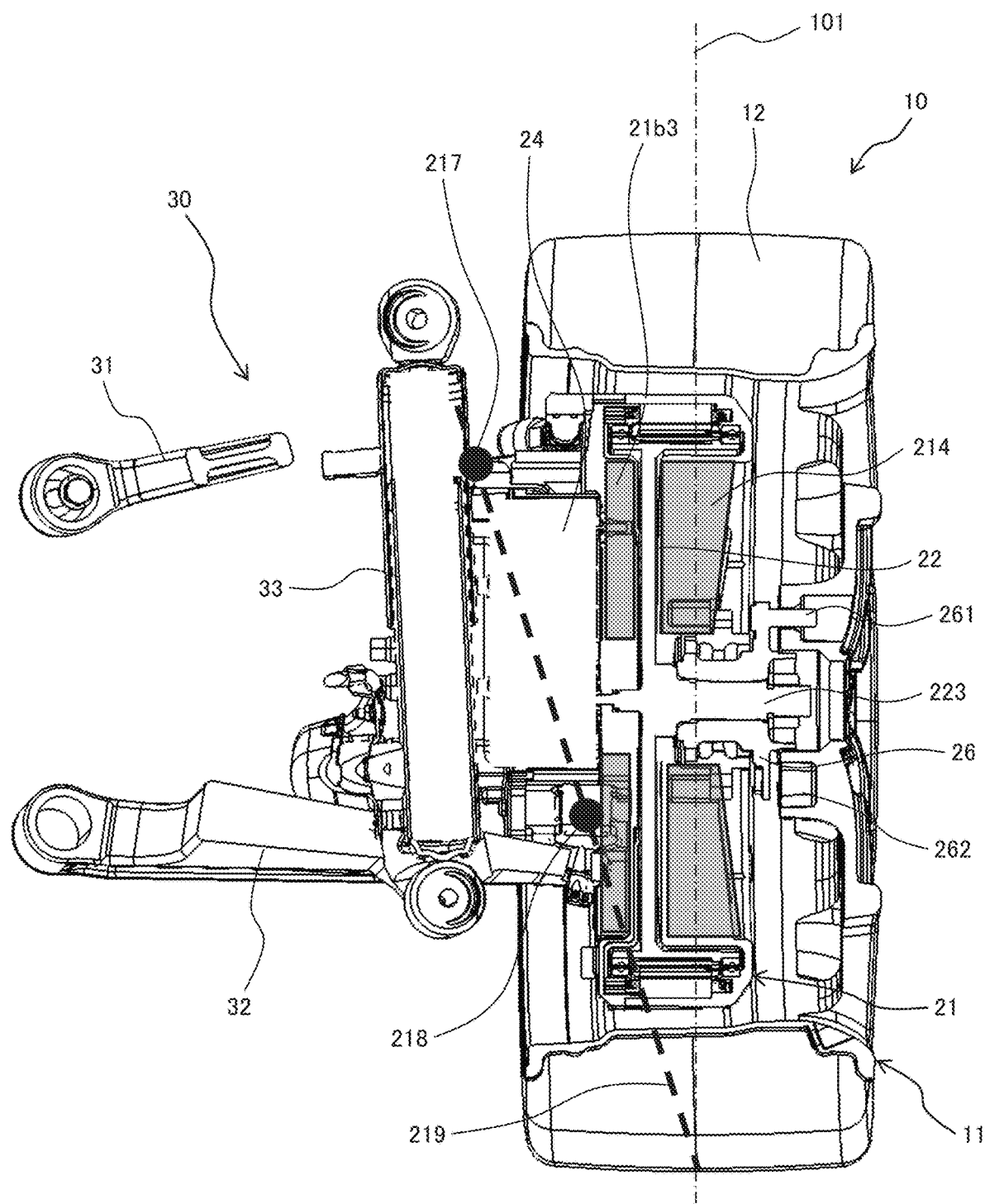
FIG. 8 is a cross-sectional view taken along line VIII-VIII of FIG. 4.

The hub bearing 26 is fixed to a hub bearing mounting portion 216 formed in a central portion of the stator housing 21a. The hub bearing 26 includes a plurality of (five in the present embodiment) hub bolts 261. The hub bolt 261 penetrates the brake disc 251. The vehicle wheel 10 is fixed to the hub bearing 26 by inserting the hub bolt 261 into a through hole of the wheel 11 and screwing a nut 262 (FIG. 8).

In the present embodiment, the stator housing 21a and the stator housing cover 21b constitute the stator 21. The stator 21 supports the inverter device 24, the brake device 25, the hub bearing 26, and the like, and is mounted to the suspension device 30 on the vehicle body side. As a result, the in-wheel motor 20 is supported by the vehicle body via the suspension device 30. The suspension device 30 of the present embodiment is an independent suspension installed in each vehicle wheel. The in-wheel motor 20 is supported by the vehicle body by the independent suspension. The independent suspension can improve followability to unevenness of a road surface, and can improve ride comfort and steering operability.

In the in-wheel motor 20, the stator 21 (the stator housing 21a and the stator housing cover 21b) and the rotor 22 disposed inside the stator 21 constitute a motor that drives the wheel 11 (vehicle wheel 10). The inverter device 24 supplies power to the motor.

In a steering wheel that is a vehicle wheel that changes a direction of a vehicle body, it is preferable to reduce an interval (scrubbing radius) between an intersection of a tire ground contact surface and a king-pin shaft that is a rotation center of steering and a center line in a width direction of the tire when viewed from a vehicle traveling direction. When the in-wheel motor is attached to the wheel, the axial direction of the in-wheel motor protrudes toward the vehicle body, the king-pin shaft is separated from the center position of the tire, and the scrubbing radius tends to be large. When the scrubbing radius increases, a large reaction force is applied to a steering mechanism at the time of steering operation, and the steering is easily taken by undulation or a step on a rough road surface when the vehicle travels on the rough road surface. In addition, when the steering wheel also serves as the drive wheel, the driving force becomes a rotational moment around the king-pin shaft, and thus there is a concern about deterioration in controllability and ride comfort. Therefore, it is preferable to reduce the length of the in-wheel motor in the axial direction. On the other hand, in order to improve the drive torque of the motor, it is preferable to increase the outer diameter of the motor. Means for solving these problems will be described below.

Figure 5:
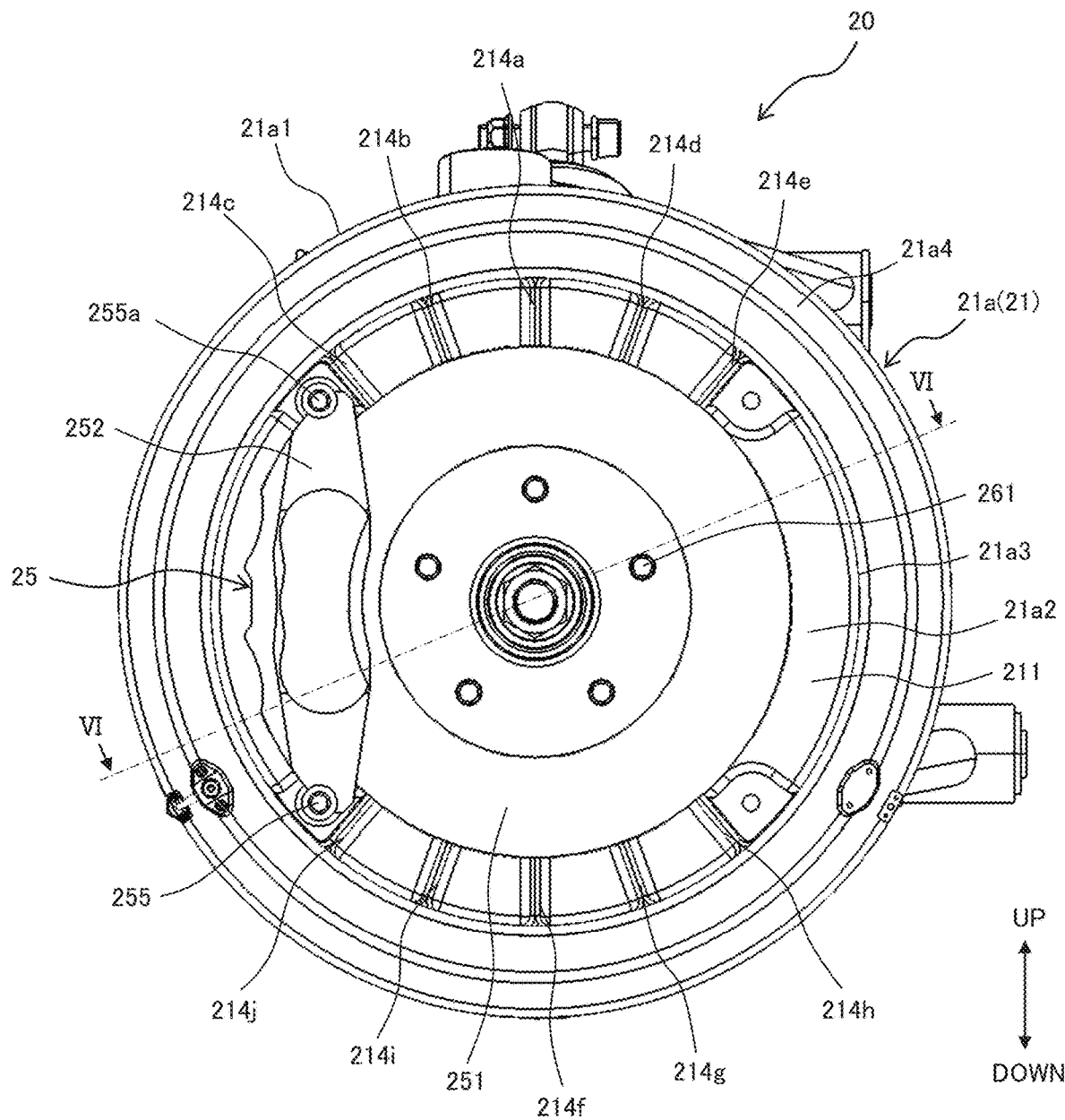
FIG. 5 is a front view of the in-wheel motor according to the embodiment of the present invention as viewed from the vehicle wheel side.
Figure 6:
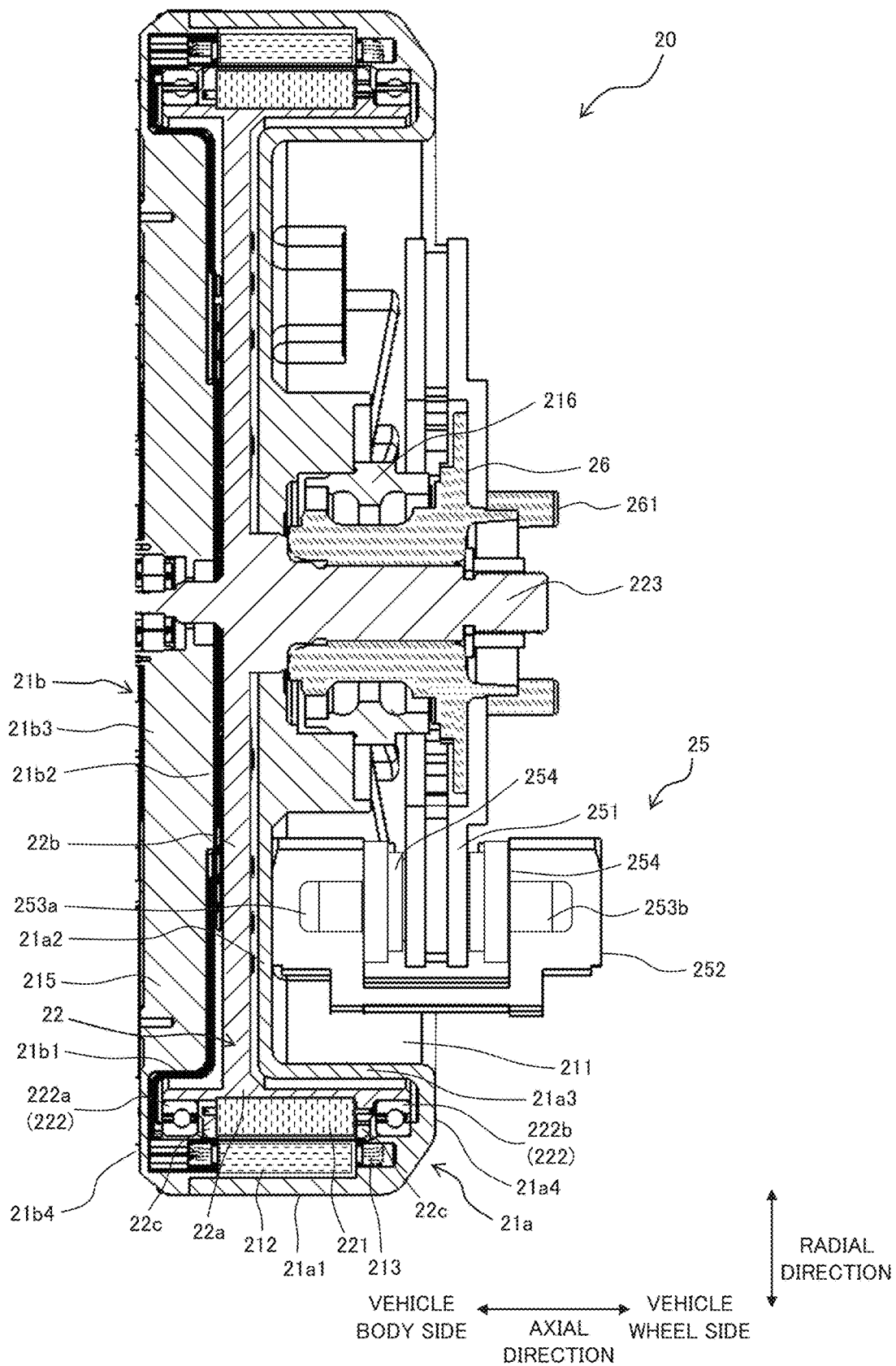
FIG. 6 is a cross-sectional view taken along line VI-VI of FIG. 5.
Figure 7:
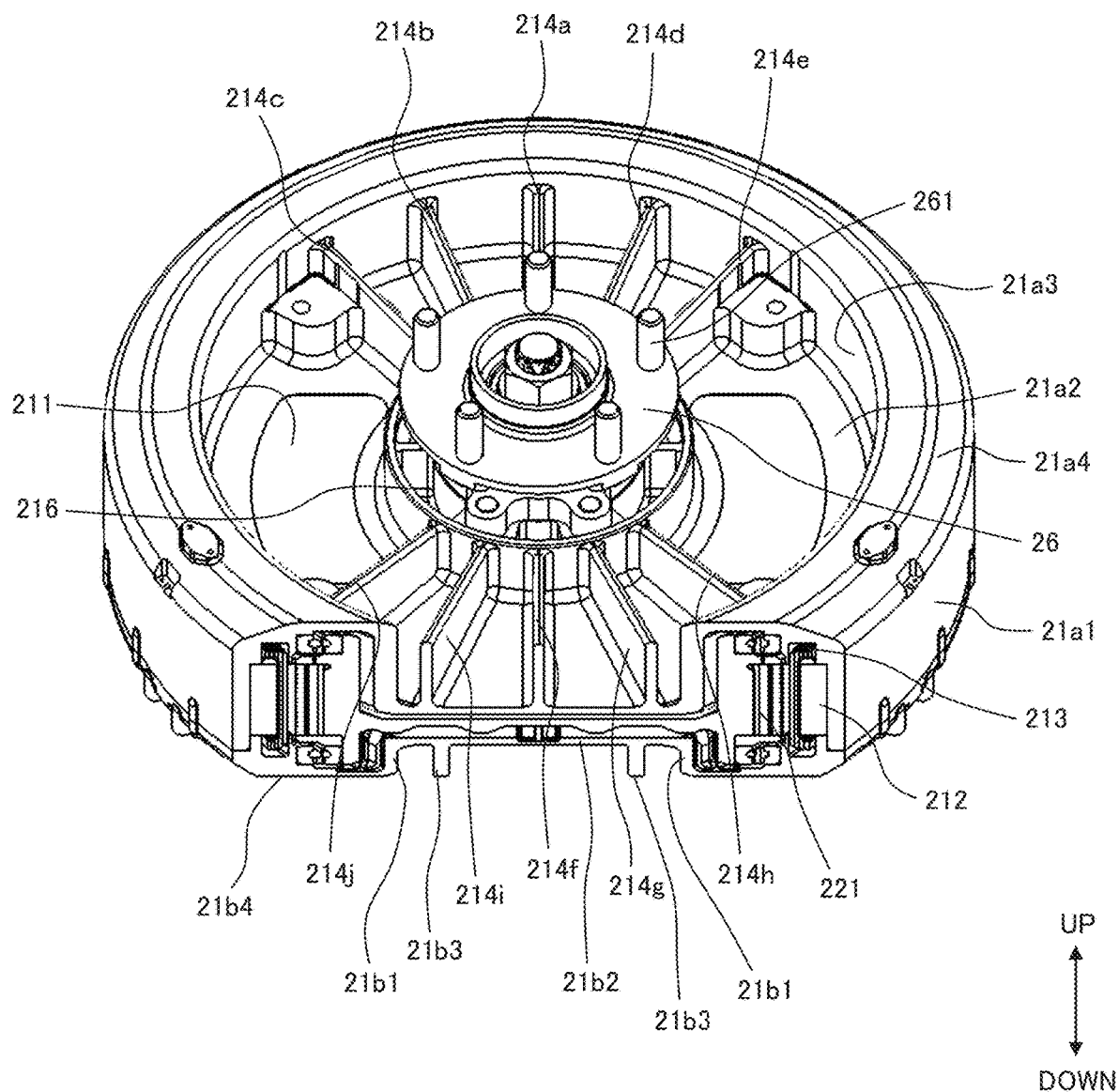
FIG. 7 is a cross-sectional perspective view of a part of the in-wheel motor according to the embodiment of the present invention as viewed obliquely from below on the vehicle wheel side.

FIG. 5 is a front view of the in-wheel motor according to the embodiment of the present invention as viewed from the vehicle wheel side. FIG. 6 is a cross-sectional view taken along line VI-VI of FIG. 5. FIG. 7 is a cross-sectional perspective view of a part of the in-wheel motor according to the embodiment of the present invention when viewed obliquely downward on the vehicle wheel side.

One side (the vehicle body side in the present embodiment) of the stator housing 21a in the axial direction is opened. The stator housing 21a includes a cylindrical housing annular portion 21a1 extending in the axial direction, a housing flat plate portion 21a2 extending in the radial direction orthogonal to the axial direction, a folded portion 21a3 extending in the axial direction and having one end connected to the housing flat plate portion 21a2, and a flange portion 21a4 extending in the radial direction orthogonal to the axial direction and having one end connected to the other end of the folded portion 21a3 and having the other end connected to the housing annular portion 21a1.

The housing flat plate portion 21a2 is disposed on the open portion side (the vehicle body side in the present embodiment) from the position of the flange portion 21a4 (end portion of the housing annular portion 21a1 on the opposite open portion side) via the folded portion 21a3. In other words, the housing flat plate portion 21a2 is disposed to be recessed from the position of the flange portion 21a4 (end portion of the housing annular portion 21a1 on the opposite open portion side) toward the open portion side (the vehicle body side in the present embodiment). That is, the stator housing 21a is formed with a housing recess 211 that is recessed from the position of the flange portion 21a4 (end portion on the opposite open portion side) toward the open portion side. The housing recess 211 is formed by the housing flat plate portion 21a2 and the folded portion 21a3.

The housing flat plate portion 21a2 is located on the open portion side (the vehicle body side in the present embodiment) with respect to the center position of the housing annular portion 21a*l* in the axial direction. In addition, a plurality of stator cores 212 are disposed radially inside the housing annular portion 21a*l* of the stator housing 21a, and the stator coil 213 is attached to the stator core 212.

The hub bearing mounting portion 216 fixed to the housing flat plate portion 21a2 is provided in a radially central portion of the housing recess 211. The hub bearing 26 is mounted to the inner periphery of the hub bearing mounting portion 216. Since a part of the hub bearing 26 is positioned in the housing recess 211, when the wheel 11 is mounted to the in-wheel motor 20, the in-wheel motor 20 is accommodated in the wheel 11.

The stator housing cover 21b is disposed so as to close the open side of the stator housing 21a. The stator housing cover 21b includes a ring-shaped housing cover flange portion 21b4 extending in the radial direction orthogonal to the axial direction and located on the outer peripheral side, a cylindrical housing cover annular portion 21b1 extending in the axial direction and having one end connected to the housing cover flange portion 21b4, a housing cover flat plate portion 21b2 connected to the other end of the housing cover annular portion 21b1 and extending in the radial direction orthogonal to the axial direction, and a rib 21b3 as a reinforcing member provided in the housing cover flat plate portion 21b2. The housing cover flange portion 21b4 is connected to and fixed to the housing annular portion 21a*l* of the stator housing 21a.

The housing cover flat plate portion 21b2 is formed to be positioned on the opposite open portion side (the vehicle wheel side in the present embodiment) from the position of the housing cover flange portion 21b4 in a state where the stator housing cover 21b closes the open side of the stator housing 21a. In other words, the housing cover flat plate portion 21b2 is disposed to be recessed from the position of the housing cover flange portion 21b4 toward the opposite open portion side (the vehicle wheel side in the present embodiment). In the stator housing cover 21b, a housing cover recess 215 recessed from the position of the housing cover flange portion 21b4 (end portion on the open portion side) toward the opposite open portion side is formed, and a rib 21b3 is disposed in the housing cover recess 215.

The housing cover flange portion 21b4 is connected to and fixed to the housing annular portion 21a*l* of the stator housing 21a. A space is formed inside the stator 21.

In the space inside the stator 21, the rotor 22 for rotationally driving the vehicle wheel is disposed. The rotor 22 includes a rotation shaft 223. The rotor 22 includes a cylindrical rotor housing 22a extending in the axial direction and a rotor flat plate portion 22b extending in the radial direction orthogonal to the axial direction and including the rotation shaft 223. The rotor flat plate portion 22b is disposed closer to the vehicle body side from the center position of the rotor housing 22a in the axial direction. Therefore, the rotor housing 22a is disposed at a position overlapping the housing recess 211 in the radial direction. At least a part of the hub bearing 26 is disposed at a position overlapping the rotor housing 22a in the radial direction.

On the radially outer side of the rotor housing 22a, two support portions 22c protruding radially outward are formed.

In addition, a plurality of permanent magnets 221 are provided on the radially outer side of the rotor housing 22a so as to be sandwiched by the support portions 22c. The permanent magnets 221 are disposed so as to face the stator core 212 with a predetermined gap. Furthermore, on the radially outer side of the rotor housing 22a, a first bearing 222a and a second bearing 222b as motor bearings 222 that rotatably support the rotor 22 with respect to the stator 21 are provided. The first bearing 222a is disposed on the vehicle body side, and the second bearing 222b is disposed on the vehicle wheel side opposite to the vehicle body side. The motor bearing 222 has rolling elements between the outer ring portion and the inner ring portion.

The brake device 25 is mounted to the stator housing 21a. The brake device 25 includes a brake disc 251 that rotates together with the rotor 22, the hub bearing 26, and the wheel 11, and a brake caliper 252 that applies a frictional force to the brake disc 251 to apply a brake to the wheel.

The brake device 25 operates in the same direction as the axial direction of the rotation shaft 223 of the motor.

A brake device for a vehicle which drives vehicle wheels by a motor is mainly an electric brake such as a regenerative brake or a waste electric brake, but it is also necessary to provide a mechanical brake in preparation for an electric brake failure at the time of sudden braking or full charge. Examples of the mechanical brake include a drum brake and a disc brake. In order to improve controllability of the brake device, a disc brake is used as a mechanical brake in the present embodiment.

As illustrated in FIG. 6, a part of the brake device 25 is accommodated in the housing recess 211 of the stator housing 21a. As a result, the overall length of the in-wheel motor 20 in the axial direction can be shortened.

The housing recess 211 of the stator housing 21a is provided with a plurality of ribs 214 (reinforcing members) connecting the folded portion 21a3 and the hub bearing mounting portion 216.

As shown in FIGS. 5 and 7, the plurality of ribs 214 are radially disposed vertically from the hub bearing mounting portion 216. Among the plurality of ribs 214 disposed on the upper side, a rib 214a is disposed at a position in the vertical direction (90 degrees) from the horizontal position. A rib 214b is disposed in a direction opening from the rib 214a by 20 degrees, that is, at a position 110 degrees from the horizontal position. A rib 214c is disposed in a direction opening from the rib 214a by 40 degrees, that is, at a position 130 degrees from the horizontal position. A rib 214d is disposed in a direction closing 20 degrees from the rib 214a, that is, at a position 70 degrees from the horizontal position. A rib 214e is disposed in a direction closing 40 degrees from the rib 214a, that is, at a position 50 degrees from the horizontal position.

On the other hand, among the plurality of ribs 214 disposed on the lower side, a rib 214f is disposed at a position in the vertical direction (270 degrees). A rib 214g is disposed in a direction opening from the rib 214g by 20 degrees, that is, at a position 290 degrees from the horizontal position. A rib 214h is disposed in a direction opening from the rib 214f by 40 degrees, that is, at a position 310 degrees from the horizontal position. A rib 214i is disposed in a direction closing 20 degrees from the rib 214f, that is, at a position 250 degrees from the horizontal position. A rib 214j is disposed in a direction closing 40 degrees from the rib 214a, that is, at a position 230 degrees from the horizontal position.

In the present embodiment, a part of the brake device 25 is disposed to be accommodated in the housing recess 211 of the stator housing 21a. In order to avoid interference between the rib 214 and the brake device 25, no rib is formed between the rib 214c and the rib 214i and between the rib 214e and the rib 214h in the present embodiment. In the present embodiment, the brake device 25 is disposed in the housing recess 211 in which no rib 214 is formed.

A part of the brake caliper 252 is disposed at a position overlapping the stator 21 (stator housing 21a) in the radial direction. The brake caliper 252 is disposed on the inner diameter side of the stator core 212. The axial end surface (part of the axial end portion) of the brake caliper 252 (brake device 25) is in contact with the housing flat plate portion 21a2 (stator 21). In other words, the axial end surface of the brake caliper 252 (brake device 25) and the housing flat plate portion 21a2 (stator 21) are in surface contact with each other.

The rib 214 functions as a reinforcing member of the stator 21, and the strength between the rib 214c and the rib 214i and between the rib 214e and the rib 214h decreases. The traveling vehicle wheel 10 receives a load in the up-down direction due to the unevenness of the road surface. The in-wheel motor 20 provided in the vehicle wheel 10 receives a load in the up-down direction similarly to the vehicle wheel 10. Therefore, the rib 214 disposed in the stator housing 21a may be disposed so as to receive a load in the up-down direction, and even when the rib 214 is not disposed between the rib 214c and the rib 214i and between the rib 214e and the rib 214h, the strength of the stator 21 can be ensured. In the present embodiment, since the rib 214 is not disposed between the rib 214c and the rib 214i and between the rib 214e and the rib 214h, the in-wheel motor 20 can be reduced in weight, and the underspring mass can be reduced. In the present embodiment, the followability of the suspension device 30 to the unevenness of the road surface is improved by reducing the underspring mass, and the ride comfort of the vehicle can be improved.

In order to ensure the strength of the stator 21 in the vertical direction, the rib 214 may be provided in a range of 45 degrees in the opening direction and the closing direction from the vertical position, that is, in a range of 45 degrees to 135 degrees from the horizontal position in the upper portion and in a range of 225 degrees to 315 degrees from the horizontal position in the lower portion.

Furthermore, in the present embodiment, the brake caliper 252 is disposed such that the longitudinal direction thereof is the up-down direction (vertical direction). Both end portions of the brake caliper 252 are fixed to the stator 21 (stator housing 21a) by fixing bolts 255a and 255b. That is, the upper portion of the brake caliper 252 is fixed to the stator housing 21a by the fixing bolt 255a, and the lower portion of the brake caliper 252 is fixed to the stator housing 21a by the fixing bolt 255b. In the present embodiment, since the brake caliper 252 is disposed such that the longitudinal direction thereof is the up-down direction (vertical direction), a load in the up-down direction can be received by the brake caliper 252 itself, and the strength of the stator 21 can be improved. In addition, since the brake caliper 252 is fixed to the stator housing 21a from the vehicle wheel 10 (wheel 11) side, it is easy to approach the brake caliper 252, and workability such as replacement of the brake pad 254 attached to the brake caliper 252 can be improved.

The brake caliper 252 includes pistons 253a and 253b that operate in the axial direction by the hydraulic pressure of the brake fluid and are disposed to face each other with the brake disc 251 interposed therebetween, and a brake pad 254 that is pressed against the brake disc 251 by the pistons 253a and 253b and generates a braking force by a frictional force. The brake pad 254 generates a braking force so as to sandwich the brake disc 251. The brake disc 251 is installed between the hub bearing 26 and the wheel 11. The brake disc 251 may be a ventilated disc or a solid disc. The material of the brake disc 251 is cast iron or the like.

Since the braking force increases and the heat generation decreases as the brake device increases in size, it is preferable that the brake device increases in size (increases in diameter). On the other hand, in order to improve the torque of the motor, it is preferable to increase the diameter of the motor. When the diameters of both the brake device and the motor are increased, the brake device and the motor overlap in the axial direction, and the axial length of the in-wheel motor (brake device+motor) increases.

In the present embodiment, the brake device is downsized, and a part thereof is accommodated in the housing recess 211 of the stator housing 21a. As a result, the overall length of the in-wheel motor 20 in the axial direction can be shortened.

Next, a connection relationship between the in-wheel motor 20 and the suspension device 30 will be described. FIG. 8 is a cross-sectional view taken along line VIII-VIII of FIG. 4.

The suspension device includes an upper arm 31 located at an upper portion, a lower arm located at a lower portion, and a shock absorber 33 that attenuates vibration.

The stator housing cover 21b includes an upper arm mounting portion 217 to which the upper arm 31 is mounted and a lower arm mounting portion 218 to which the lower arm 32 is mounted.

The lower arm mounting portion 218 is disposed at a position closer to the rotation shaft 223 than the rotor housing 22a. The lower arm mounting portion 218 is located closer to the vehicle wheel 10 (wheel 11) than the upper arm mounting portion 217 is. In the stator housing cover 21b of the present embodiment, the housing cover recess 215 recessed from the position of the housing cover flange portion 21b4 (end portion on the open portion side) toward the opposite open portion side is formed, and the lower arm mounting portion 218 is provided in the housing cover recess 215. Therefore, the position of the lower arm mounting portion 218 can be brought close to the wheel 11. The king-pin shaft 219 connecting the upper arm mounting portion 217 and the lower arm mounting portion 218 is inclined so as to descend from the vehicle body side toward the vehicle wheel 10. In the present embodiment, since the position of the lower arm mounting portion 218 is made close to the wheel 11 side, the king-pin shaft 219 and a center line 101 of the vehicle wheel 10 (tire 12) can be made substantially coincident with each other on the ground contact surface of the tire 12. That is, in the present embodiment, the scrubbing radius can be set to zero.

The inverter device 24 is disposed between the upper arm mounting portion 217 and the lower arm mounting portion 218. In the present embodiment, since the inverter device 24 is disposed between the upper arm mounting portion 217 and the lower arm mounting portion 218, the inverter device 24 can be mounted to the stator housing cover 21b without moving the king-pin shaft 219. Furthermore, since the casing of the inverter device 24 can increase the rigidity of the stator housing cover 21b, the height of the rib 21b3 in the axial direction formed in the housing cover recess 215 of the steering 1b can be reduced, and the length of the in-wheel motor 20 in the axial direction can be reduced.

As described above, according to the present embodiment, since the housing recess 211 is formed in the stator housing 21a and a part of the hub bearing 26 is positioned in the housing recess 211, when the wheel 11 is mounted to the in-wheel motor 20, the in-wheel motor 20 is accommodated in the wheel 11. As a result, the length of the in-wheel motor 20 in the axial direction can be shortened, and when the suspension device 30 is mounted to the in-wheel motor 20, the king-pin shaft 219 and the center line of the tire 12 on the ground contact surface of the tire 12 can coincide with each other. In the present embodiment, the scrubbing radius can be made zero, the reaction force at the time of the steering operation can be suppressed, and the steering can be suppressed from being taken by undulation or a step on a rough road surface when the vehicle travels on the rough road surface.

In the present embodiment, since the housing recess 211 includes the plurality of ribs 214 as reinforcing members, the strength of the stator 21 can be ensured.

Furthermore, in the present embodiment, since the brake device 25 is provided in the housing recess 211, the length of the in-wheel motor 20 in the axial direction can be shortened. In addition, the brake caliper 252 is disposed so that the longitudinal direction of the brake caliper 252 of the brake device 25 is the up-down direction (vertical direction) of the stator housing 21a, a load in the up-down direction can be received by the brake caliper 252 itself, and the strength of the stator 21 can be improved.

The present invention is not limited to the embodiments described above, but includes various modifications. For example, the embodiment described above has been described in detail for easy understanding of the present invention, and is not necessarily limited to that having all the configurations described.

REFERENCE SIGNS LIST 10 vehicle wheel
11 wheel
12 tire
13 spoke
14 rim
20 in-wheel motor
21 stator
21a stator housing
21a1 housing annular portion
21a2 housing flat plate portion
21a3 folded portion
21a4 flange portion
21b stator housing cover
21b1 housing cover annular portion
21b2 housing cover flat plate portion
21b3 rib
21b4 housing cover flange portion, housing cover flange portion
21b422 rotor
22a rotor housing
22b rotor flat plate portion
22c support portion
24 inverter device
25 brake device
26 hub bearing
30 suspension device
31 upper arm
32 lower arm
33 shock absorber
101 center line
211 housing recess
212 stator core
213 stator coil
214, 214a to 214j rib
215 housing cover recess
216 hub bearing mounting portion
217 upper arm mounting portion
218 lower arm mounting portion
219 king-pin shaft
221 permanent magnet
222 motor bearing
222a first bearing
222b second bearing
223 rotation shaft
251 brake disc
252 brake caliper
253a, 253b piston
254 brake pad
255a, 255b fixing bolt
261 hub bolt
262 nut

The invention claimed is:

1. An in-wheel motor comprising a motor at least a part of which is disposed inside a wheel and which transmits power to the wheel, the in-wheel motor being supported by a vehicle by using a suspension device,
wherein the motor includes a stator and a rotor, the rotor being disposed inside the stator and including a rotation shaft,
the stator includes a stator housing opened on one side and a stator housing cover closing an open portion of the stator housing,
the stator housing includes a housing annular portion having a cylindrical shape and extending in an axial direction, a housing flat plate portion extending in a radial direction orthogonal to the axial direction, a folded portion extending in the axial direction and having one end connected to the housing flat plate portion, and a flange portion extending in the radial direction orthogonal to the axial direction, and having one end connected to the other end of the folded portion and an other end connected to the housing annular portion,
a housing recess is formed in the stator housing by the housing flat plate portion and the folded portion,
a hub bearing mounting portion which is fixed to the housing flat plate portion and to which a hub bearing is mounted is provided at a radially central portion of the housing recess,
the wheel is fixed to the hub bearing via a hub bolt, and
the stator housing cover includes an upper arm mounting portion to which an upper arm of the suspension device is mounted and a lower arm mounting portion to which a lower arm is mounted.

2. The in-wheel motor according to claim 1, wherein the housing recess includes a plurality of reinforcing members each connecting the housing annular portion and the hub bearing mounting portion.

3. The in-wheel motor according to claim 2, wherein each of the reinforcing members is provided in a range of 45 degrees to 135 degrees from a horizontal position and in a range of 225 degrees to 315 degrees from a horizontal position.

4. The in-wheel motor according to claim 1, wherein a brake device is disposed in the housing recess.

5. The in-wheel motor according to claim 1, wherein
the rotor includes a rotor housing having a cylindrical shape and extending in the axial direction, and a rotor flat plate portion extending in the radial direction orthogonal to the axial direction and including the rotation shaft, and
the rotor flat plate portion is disposed closer to a vehicle body side from a center position of the rotor housing in the axial direction.

6. The in-wheel motor according to claim 5, wherein at least a part of the hub bearing is disposed at a position overlapping the rotor housing in the radial direction.

7. The in-wheel motor according to claim 5, wherein the lower arm mounting portion is disposed at a position closer to the rotation shaft than the rotor housing.

8. The in-wheel motor according to claim 7, wherein
the stator housing cover includes a housing cover recess recessed toward an opposite open portion side of the stator housing, and
the lower arm mounting portion is provided in the housing cover recess.

9. The in-wheel motor according to claim 8, wherein
the stator housing cover includes an inverter device that supplies power to the motor, and
the inverter device is disposed between the upper arm mounting portion and the lower arm mounting portion.

10. The in-wheel motor according to claim 1, wherein the in-wheel motor is supported by a vehicle body by using an independent suspension.

* * * * *